United States Patent [19]

Standler

[11] Patent Number: 5,398,150
[45] Date of Patent: Mar. 14, 1995

[54] COORDINATED ELECTRIC SURGE SUPPRESSOR WITH MEANS FOR SUPPRESSING OSCILLATORY TRANSIENT OVERVOLTAGES

[75] Inventor: Ronald B. Standler, Lexington, Ky.

[73] Assignee: Dehn & Soehne GmbH, Germany

[21] Appl. No.: 848,270

[22] Filed: Mar. 9, 1992

[51] Int. Cl.[6] ............................................. H02H 9/00
[52] U.S. Cl. ...................................... 361/118; 361/56; 361/111; 361/113
[58] Field of Search .................. 361/54, 56, 118, 117, 361/119, 111, 113

[56] References Cited

U.S. PATENT DOCUMENTS

| | | | |
|---|---|---|---|
| 1,300,127 | 4/1919 | Creighton | 361/118 |
| 2,163,742 | 6/1939 | Wolfskill | 250/36 |
| 2,246,926 | 6/1941 | Roman | 361/118 |
| 2,290,639 | 7/1942 | Evans | 175/30 |
| 3,215,896 | 11/1965 | Shattuck et al. | 317/16 |
| 3,258,635 | 6/1966 | Carothers et al. | 313/231 |
| 3,310,707 | 3/1967 | Boksjo | 315/123 |
| 3,322,975 | 6/1967 | Smith | 307/93 |
| 4,089,032 | 6/1978 | Orfano | 361/56 |
| 4,439,807 | 3/1984 | Reitz | 361/127 |
| 4,550,285 | 10/1985 | Kugler et al. | 323/343 |
| 4,587,588 | 5/1986 | Goldstein | 361/56 |
| 5,023,746 | 6/1991 | Epstein | 361/56 |

OTHER PUBLICATIONS

Standler—"Protection of Electronic Circuits from Overvoltages"—1980.
General Electric data sheet for 520 v. Tranquell® secondary surge arrester, May 31, 1983, U.S.A.
Joslyn data sheet for 175 V valve type secondary surge arrester, 1989, U.S.A.
Scuka, V., "EMI Control in Low-Voltage Power Installations," *Seventh International Zurich Symposium on EMC*, paper 79M4, 1987, Sweden.
Hasse, P.; Wiesinger, J.; Zischank, W.; "Insulation Coordination in Low Voltage Systems Also in Case of Lightning Strokes" *Elektrotechnische Zeitschrift*, 110: 64–66, Jan. 1989, Germany.
Standler, R. B., "Coordination of Surge Arrestors and Suppressors for Use on Low-Voltage Mains", *Ninth International Zurich Symposium on EMC*, pp. 517–524 Mar. 12, 1991, Switzerland.
IEC Publication 664, pp. 14–15; Jun. 1991.

Primary Examiner—Marc S. Hoff
Assistant Examiner—S. Jackson
Attorney, Agent, or Firm—Eckert Seamans Cherin & Mellott

[57] ABSTRACT

A protective device for electric loads coupled to power circuits, such as the ac power lines inside buildings, has a surge suppressor including a nonlinear surge-protective device in shunt with a resistor-capacitor damping network. This suppressor circuit is well coordinated with a suitable arrester connected to the power lines, for example at the point of entry of ac supply mains into the building. The arrester has a lower voltage protection level than the surge suppressor. This suppressor circuit limits transient voltages at the load and also damps the oscillatory surges that occur in a power connection as described.

22 Claims, 5 Drawing Sheets

COORDINATED ELECTRIC SURGE SUPPRESSOR WITH MEANS FOR SUPPRESSING OSCILLATORY TRANSIENT OVERVOLTAGES

BACKGROUND OF THE INVENTION

1. Field of the Invention

This invention relates to the field of devices for suppressing transient electric disturbances on conductors, particularly low-voltage ac supply mains. The invention provides an electric surge suppressor especially for connection to branch circuits inside buildings, and includes a varistor in shunt with a resistor-capacitor damping network. This suppressor circuit is well coordinated with a suitable arrester and the suppressor circuit also provides damping of oscillatory surges.

2. Prior Art

Transient overvoltages, also called surges, that propagate on electric power conductors inside buildings are a common cause of damage and malfunction to electronic equipment, including computers, television receivers, video tape recorders, etc. Surge voltages typically measured in buildings may have durations ranging from sub-microseconds to a few milliseconds. Surge voltages can be unipolar or oscillatory, as described, for example in American National Standard C62.41-1991.

Unipolar overvoltages that impinge on a network of branch circuits often are converted to an oscillatory overvoltage by superposition of multiple reflections from impedance discontinuities along the branch circuit. Such discontinuities can be caused by electric loads that are connected along the branch circuit, as well by ends and junctions defined by the branch circuits. Unipolar overvoltages that impinge on branch circuits can also produce oscillations from the well-known response of an LC circuit produced by a combination of reactive loads, i.e., inductive and capacitive loads.

There have been numerous efforts to limit the peak magnitude of the surge voltage, and therefore to prevent damage and/or malfunction in electronic equipment. Most devices developed since about 1970 include one or more metal oxide varistor(s), silicon semiconductor(s), or filter circuit(s). Many of these devices are complicated and expensive to produce.

It is known to those skilled in the art that protection from surge voltages that is both effective and economical requires a combination of two different types of surge-protective devices. These two types are commonly known as arresters and suppressors.

An arrester is a heavy-duty surge-protective device that should be connected near the point at which the power conductors enter the building. Common places for the installation of an arrester include at the electric service meter, which measures kW.h consumption, or at the circuit breaker panel, both usually located near the entry point of the power conductors into the building. The purpose of an arrester is to divert large surge currents occurring with lightning strokes (e.g., more than 10 kA for between a few tens of microseconds and a few milliseconds). These surges can transfer more than 100 joules of energy to a surge-protective device. Surges characterized by such large energy deposition capability cannot be absorbed by low-cost surge-protective components.

A suppressor is a light-duty surge-protective device that should be installed between the branch circuit and the vulnerable equipment (e.g., a computer). The purpose of the suppressor is to further limit overvoltages at vulnerable equipment, especially small surges that either originate from switching loads inside the building or propagate down the power conductors from the arrester. Some models of suppressors also reduce the rate of change of voltage (dV/dt) at the equipment, which may help avoid temporary malfunction ("upset") of susceptible equipment that occurs without permanent damage.

In conventional applications, it has been common practice to specify the arrester with a greater conduction voltage than the suppressor. For example, one might use an arrester that limits the surge voltage to less than 2 kV and a suppressor that limits the surge voltage to less than 0.5 kV. The difference in voltage across the two surge-protective devices is the voltage drop along the resistance and inductance of the wire that connects them together, which typically might be a few tens of meters of wire. However, the resistance and inductance of the connecting wire, as well as the voltage protection levels of the conventional arrester and suppressor may not be coordinated. As a result, the voltage drop along the wire that connects the conventional arrester and suppressor can be inadequate. Thus the conventional suppressor is likely to conduct more current than the conventional arrester.

For surges with a current rate of change (dI/dt) of more than 0.5 kA/$\mu$s, the inductance of the wire between the arrester and suppressor typically provides adequate coordination of the currents in these two protective devices. However, for surges with smaller values of dI/dt, such as commonly occur with surges with durations of more than 100 $\mu$s, the impedance of the wire between the conventional arrester and suppressor may not be adequate to prevent excessive currents from flowing in the suppressor. It is possible for long-duration surges to cause surge suppressors to degrade or even to explode.

Recently, it has become clear that the best coordination is obtained by specifying that the surge arrester has a lower conduction voltage than the surge suppressor. In this way, the peak surge current in branch circuits inside a building can be limited to a relatively small value (e.g., less than 500 A), regardless of the duration of the surge or the impedance of the wire between the arrester and suppressor. By limiting the surge currents inside the building, one can reduce the transient electromagnetic fields radiated by the surge current and achieve improved electromagnetic compatibility. Large surge currents inside buildings are undesirable, because such large currents create large magnetic fields that may transfer energy electromagnetically to other conducting loops and thereby cause either damage or upset to electronic devices, including those not directly connected to the power conductors carrying the surge.

The present inventor has noted that conventional surge suppressors with low conduction voltages generally function to damp oscillatory responses in the branch circuit and at loads in the vicinity of the suppressor. As the conduction voltage of the suppressor is increased, in order to obtain better coordination, the problem of oscillatory overvoltages becomes worse.

In conventional practice there is an inability to achieve both excellent coordination with long-duration surges and suppression of oscillatory surges on branch circuits.

SUMMARY OF THE INVENTION

It is a principal object of this invention to improve operation of surge suppressors on power circuits, by improving coordination with long-duration surges while also suppressing oscillatory surges.

An additional object of the invention is to provide a surge suppressor that does not divert large surge currents from an appropriately selected arrester, regardless of the length of wire that connects the arrester and suppressor, and regardless of the value of rate of change of surge current or the value of the surge current. This object is important in obtaining satisfactory electromagnetic compatibility inside buildings that contain vulnerable or susceptible electronic circuits.

Yet another object of this invention is to provide a surge suppressor that has a very low cost.

These and other objects are accomplished by an electric surge suppressor for connection to branch circuits inside buildings including a nonlinear surge-protective element in shunt with a resistor-capacitor damping network. This suppressor circuit is well coordinated with a suitable arrester and the suppressor circuit also provides damping of oscillatory surges.

The invention comprises a nonlinear element that becomes highly conductive at approximately twice the peak of the normal sinusoidal mains voltage, in shunt with an RC network. The capacitor in the RC network blocks the flow of 50 or 60 Hz current in the resistor and prevents the resistor from unduly dissipating heat during normal operation of the power circuit and loads. However, the capacitor in the RC network presents a negligible impedance during the passage of oscillatory overvoltages, which commonly occur at frequencies between about 50 kHz and 10 MHz. The resistor in the RC network serves to damp the oscillatory response of the branch circuits and loads.

BRIEF DESCRIPTION OF THE DRAWINGS

There are shown in the drawings certain exemplary embodiments of the invention as presently preferred. However, the invention is not limited to the examples, and accordingly, reference should be made to the appended claims in order to assess the scope of the invention. In the drawings.

DETAILED DESCRIPTION OF THE PREFERRED EMBODIMENTS

Figure 1:
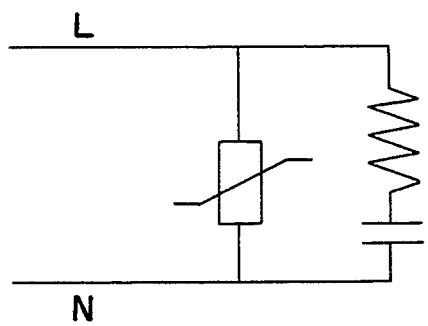
FIG. 1 is a schematic circuit diagram illustrating a preferred embodiment of a coordinated electric surge suppressor with means for suppressing oscillatory transient overvoltages according to the present invention.

The preferred embodiment of the invention is applicable to two-wire and three-wire ac power circuits. The basic suppressor circuit to be connected to a two-wire branch circuit is shown in FIG. 1. The letters "L" and "N" in FIG. 1 designate the line and neutral conductors, respectively.

For use on ac supply mains with a sinusoidal line-to-neutral voltage of 120 V rms, the preferred nonlinear element in the suppressor should conduct a current of about 1 mA at a voltage of approximately 390 V. The suppressor is coupled to the power conductors downstream from a suitable arrester along a path from the mains connection toward the load. The nonlinear element in the suppressor can be a metal oxide varistor with a diameter, for example, of about 10 mm. A suitable nonlinear element is the Siemens metal-oxide varistor, part number S10K250.

A corresponding arrester, for use on ac supply mains with a sinusoidal line-to-neutral voltage of 120 V rms, comprises a metal oxide varistor with a diameter of at least 32 mm and a conduction voltage at a current of 1 mA between approximately 220 V and 260 V. A suitable nonlinear element with these characteristics is the Siemens metal-oxide varistor, part number B40K150. This arrester is well coordinated with the suppressor varistor described in the previous paragraph. The arrester preferably is connected to the ac supply mains at or near the point where the electric power enters the building.

For use on ac supply mains with a sinusoidal line-to-neutral voltage of between 220 and 250 V rms, the preferred nonlinear element in the suppressor should conduct a current of about 1 mA at a voltage of approximately 680 V. The nonlinear element in the suppressor can be a metal oxide varistor with a diameter, for example, of about 10 mm. A suitable nonlinear element is the Siemens metal-oxide varistor, part number S10K420. A corresponding arrester, for use on ac supply mains with a sinusoidal line-to-neutral voltage of between 220 and about 240 V rms, comprises a metal oxide varistor with a diameter of at least 32 mm and a conduction voltage at a current of 1 mA of approximately 430 V. A suitable nonlinear element with these characteristics is the Siemens metal-oxide varistor, part number B40K275. This combination of arrester and suppressor is well coordinated.

Many possible values of resistance R and capacitance C will be found to be generally acceptable in the novel suppressor circuit shown in FIG. 1, however the choice of values will affect the time constant of the series connected RC leg, as well as the heat dissipation. Larger values of capacitance tend to be preferable because they allow the RC circuit to damp oscillations of lower frequency. However, large capacitors may be bulky and/or expensive. If the capacitance value is too large, the resistor will experience substantial heating from passage of 50 or 60 Hz sinusoidal current. It has been found that capacitance values between 0.1 $\mu$F and 0.5 $\mu$F are practical in the circuit of FIG. 1. It has also been found that resistance values between approximately 22Ω and 50Ω give good results in most practical cases.

The capacitor is preferably constructed of nonflammable material and rated by appropriate safety agencies (VDE 0565-1 or Underwriters Laboratories 1414) for connection across the line and neutral conductors of the ac supply mains. This is desirable because otherwise the capacitor could become a fire hazard in a situation where the suppressor varistor fails as an open circuit. Such a situation could occur due to an error or misapplication of the device by the installer or user, in which there is no functional arrester connected upstream from the suppressor.

The resistor is preferably a carbon composition type resistor, as well known to those skilled in design and construction of electronic circuits. Calculations show that carbon composition resistors with a power rating of at least ½ watt are suitable for use in the present invention. Resistors that are composed of a thin film of metal or carbon are more easily damaged by exposure to surges than carbon composition resistors, so film resistors are not generally appropriate for this application.

This circuit suppresses oscillations in two different ways. The low impedance of the series capacitance and resistance can attenuate overvoltages on branch circuits by voltage division with the characteristic impedance of the transmission line, which is typically approximately 100Ω for branch circuits in the ac supply mains. This circuit also works by providing resistive damping of the oscillations caused by reactive loads.

One might propose to achieve comparable results, for example, by connecting a 20Ω resistance across the ac supply mains. However, when energized continuously at 120 V rms, this resistance would dissipate a power of 720 watts. Not only would this be a waste of energy, but the high power dissipation would require that the resistor be bulky and expensive, perhaps including thermal transfer means for dissipating resistive heating. The circuit described herein is more energy efficient, smaller, and uses less expensive components.

Figure 2:
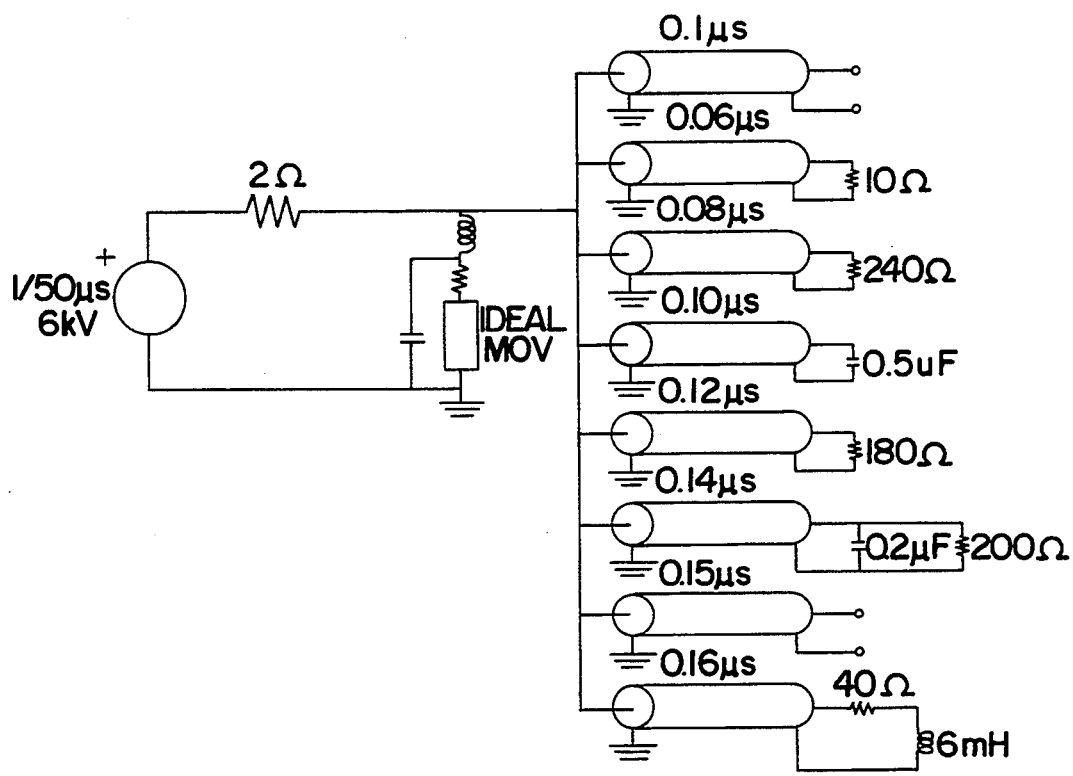
FIG. 2 is a schematic circuit diagram of a simplified network of eight branch circuits, loads, and an arrester.

The operation of the novel circuit shown in FIG. 1 can be demonstrated graphically using computer simulations such as PSPICE software. The circuit shown in FIG. 2 is a simple representation of eight exemplary branch circuits in a building or the like. The source of the surge is a Thévenin voltage source that produces an unipolar 1.2/50 μs voltage wave, which is described in standards such as IEC 60-2 and ANSI/IEEE C62.41-1991. The peak value of the open-circuit voltage is 6 kV; the source impedance is 2Ω, so this surge gives a peak short-circuit current of 3 kA. Various loads are connected to the ends of the eight transmission lines in FIG. 2, which are assumed to be ideal and of various lengths. For comparative calculations of the performance of suppressor circuits, the suppressor is connected at the open-circuit end of the 0.15 μs transmission line.

Figure 3:
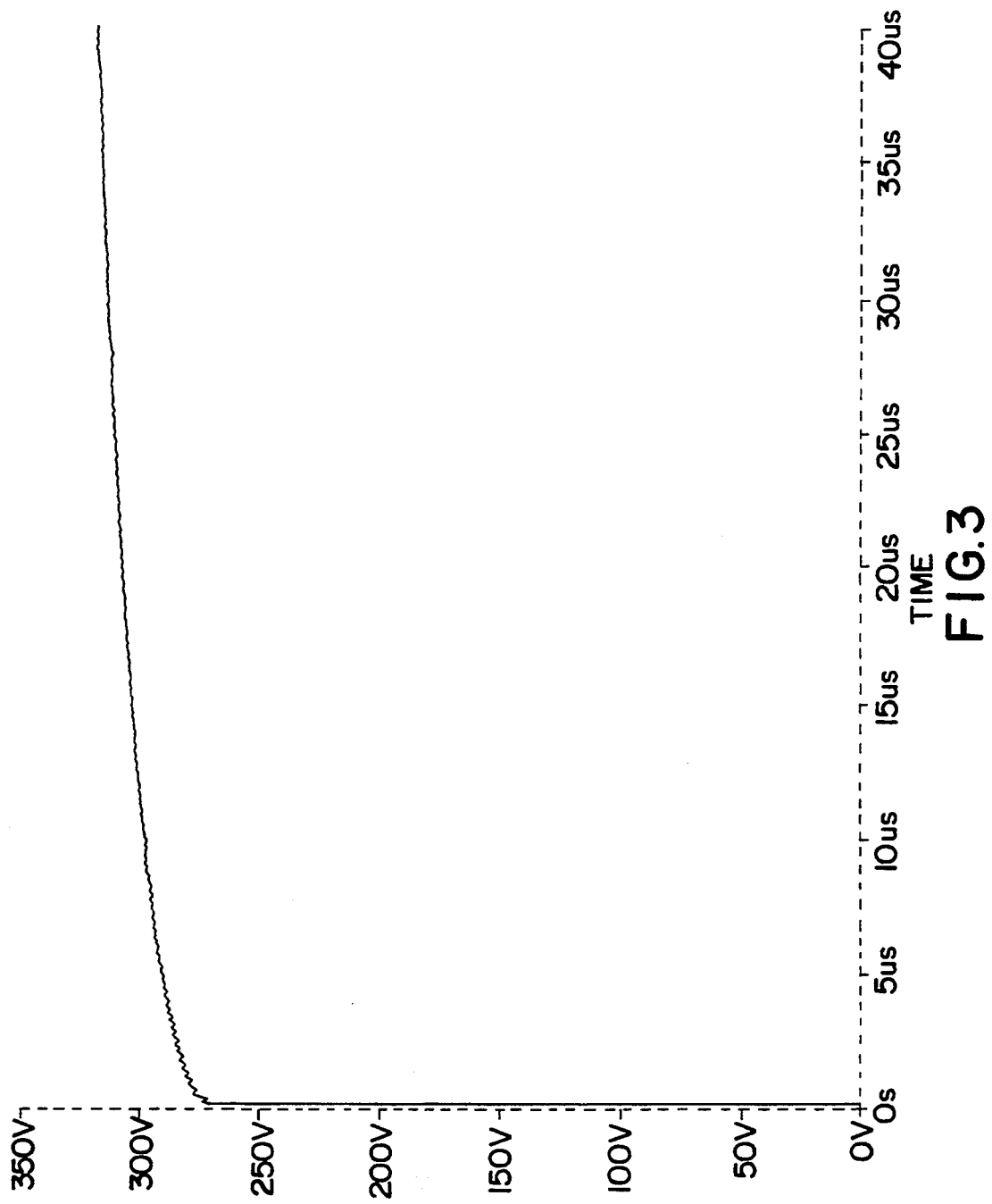
FIG. 3 is a plot showing the voltage across the suppressor as a function of time, where the suppressor is typical of a conventional metal-oxide varistor with a low conduction voltage.

FIG. 3 shows the voltage across a conventional suppressor circuit (not shown), connected at the end of the 0.15 μs transmission line. The conventional suppressor has a reference voltage of 200 V at a current of 1 mA, which is smaller than the 240 V reference voltage of the arrester. This conventional suppressor gives a correspondingly low voltage protective level, about 320 V. While this low level may appear desirable, it draws large surge currents inside the building, which may create additional problems due to electromagnetic coupling to other circuits, as described above. When this conventional suppressor is connected to an arrester with a short length of line, the light-duty suppressor will serve undesirably to protect the heavy-duty arrester, which is likely to result in the degradation and eventual destruction of the suppressor.

Figure 4:
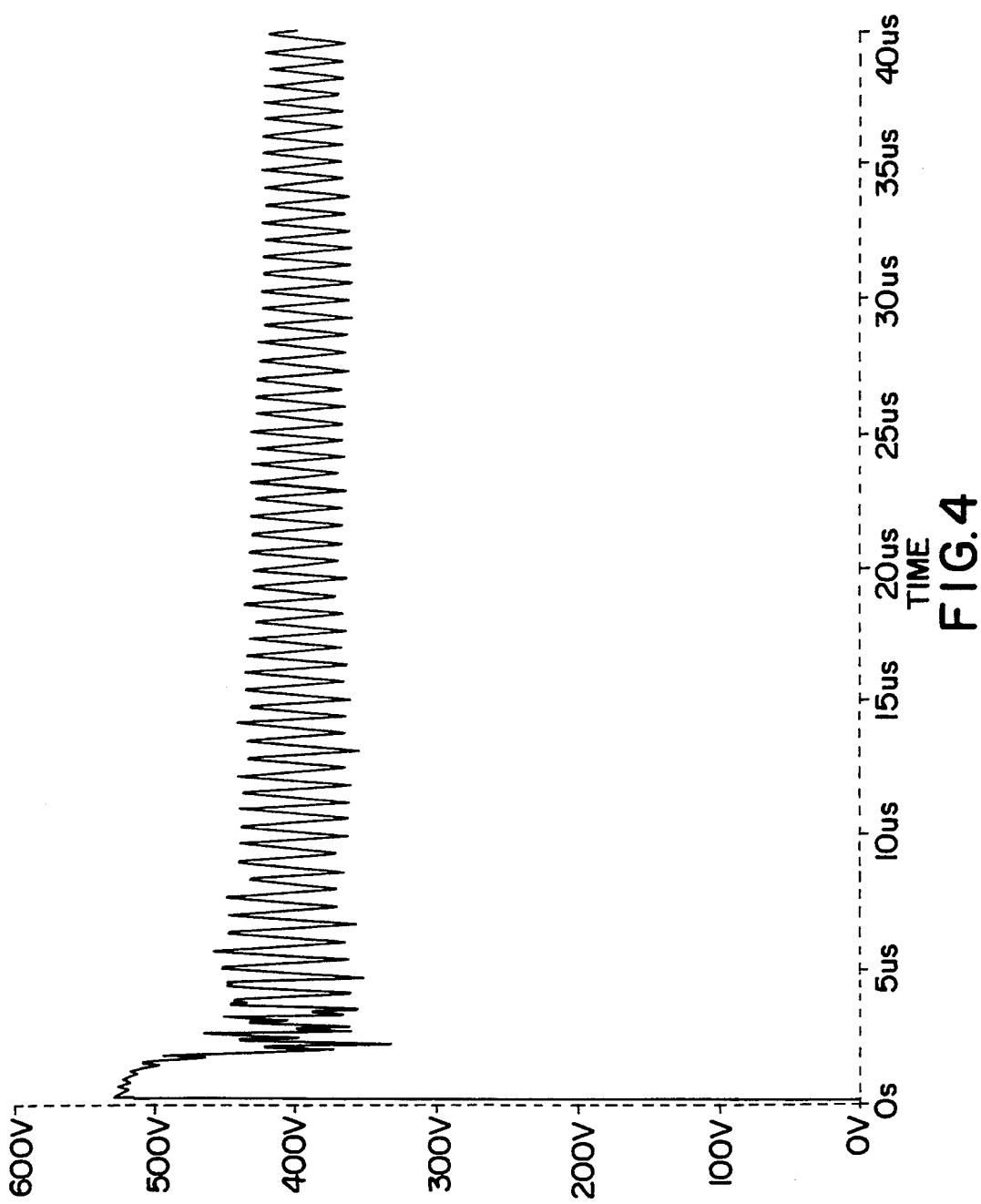
FIG. 4 is a plot showing the voltage across the suppressor as a function of time, where the suppressor is a varistor whose conduction voltage is chosen in accordance with the present invention.

FIG. 4 shows the voltage across a well-coordinated suppressor varistor according to the invention, connected at the end of the 0.15 μs transmission line. This varistor has a reference voltage of 390 V at a current of 1 mA, which is much larger than the 240 V reference voltage of the arrester. This suppressor is always well-coordinated with the arrester: the current in the suppressor is less than 1% of the current in the arrester, even when the arrester and suppressor are connected in parallel with no impedance between them. However, as can be seen from FIG. 4, the voltage protection level is about 530 V and this suppressor is unable to damp the oscillations in the network of eight branch circuits.

Figure 5:
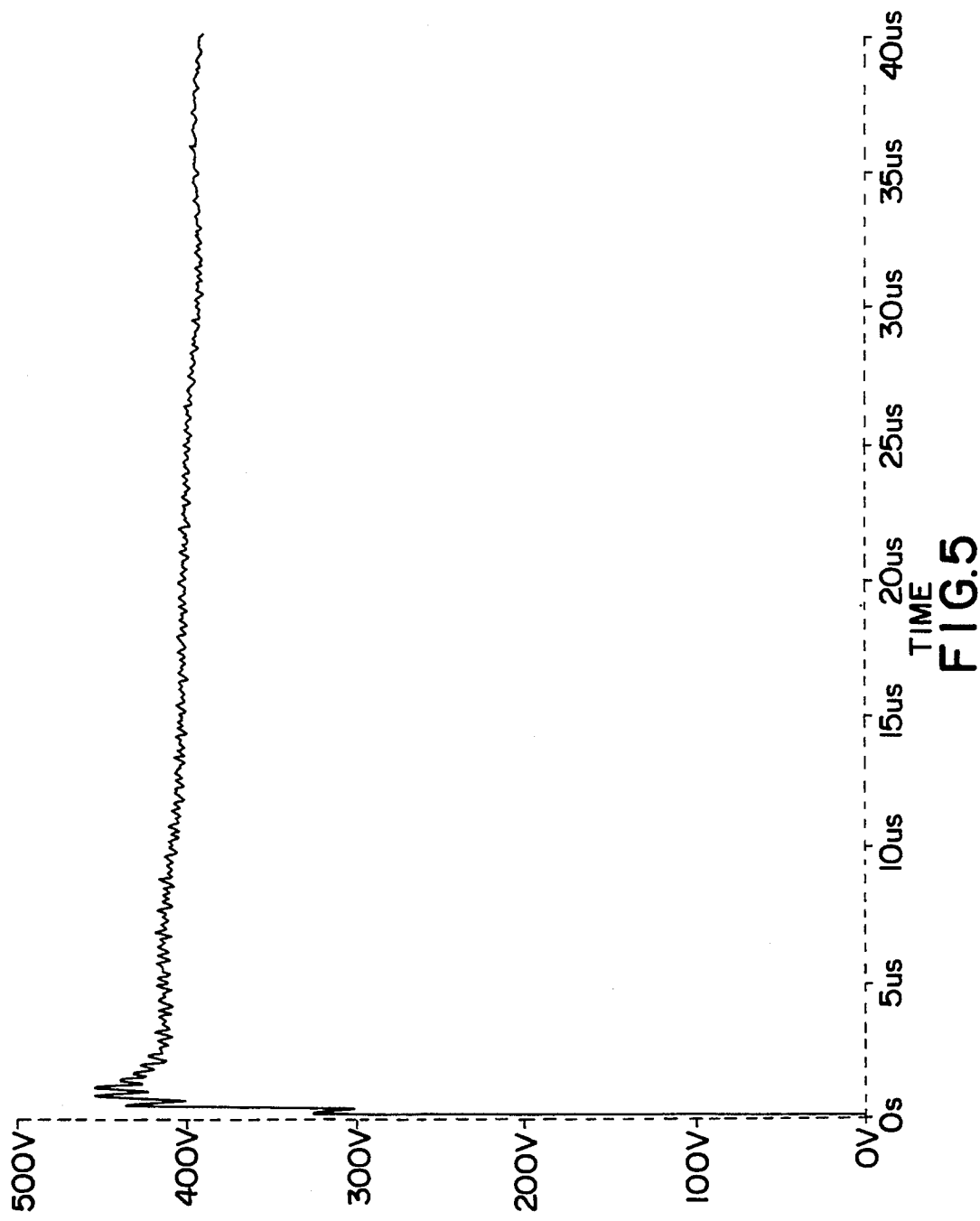
FIG. 5 is a plot showing the voltage across the novel suppressor circuit illustrated in FIG. 1 as a function of time, with the preferred values of the components that are described in detail hereinafter.

FIG. 5 shows the response when the preferred embodiment of the novel suppressor circuit of FIG. 1 is connected at the end of the 0.15 μs transmission line in FIG. 2. The same varistor is used in the simulations presented in FIGS. 4 and 5. The voltage scale of FIG. 5 is more expanded than in FIG. 4, however it is apparent that the voltage protection level in FIG. 5 is about 80 V less than in FIG. 4 and the amplitude of oscillations in FIG. 5 is substantially smaller than in FIG. 4. Accordingly, a comparison of these figures shows that the addition of the resistance-capacitance damping circuit to the varistor in FIG. 4 gives a substantial improvement in performance at a small increase in cost due to the additional components.

Figure 6:
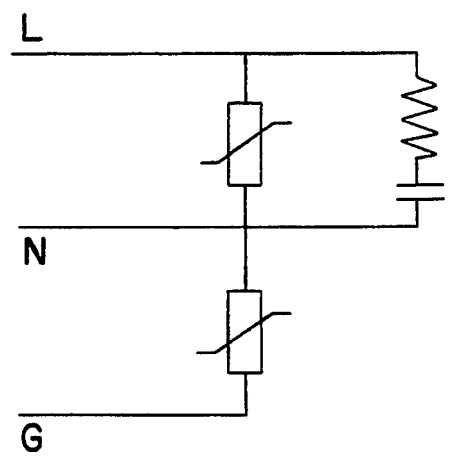
FIG. 6 is a schematic circuit diagram showing an alternative embodiment of the suppressor circuit according to the invention, with a grounding conductor present.

In power circuits with a safety ground (earth) wire, which is conventionally either green or green with a yellow stripe, the novel suppressor circuit of the invention can be embodied as shown in FIG. 6. The two varistors in FIG. 6 have the same nominal reference voltage at a current of 1 mA.

Figure 7:
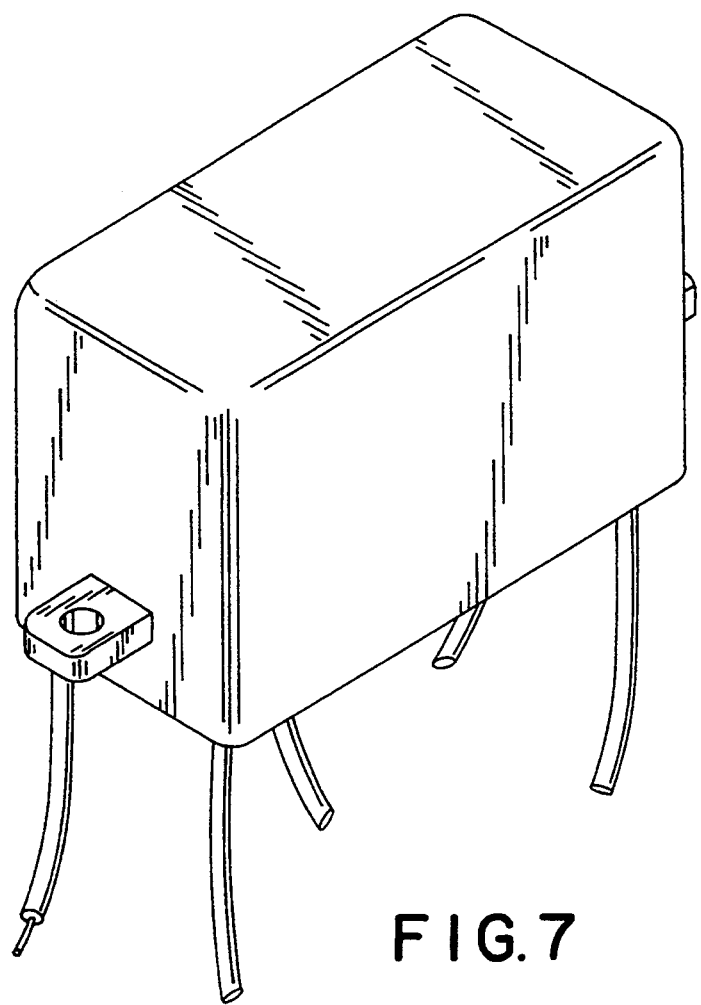
FIG. 7 is a perspective view showing a miniature package for housing the circuit of the present invention, that is suitable for installation during construction of a building, inside a wall outlet box or the like, where it is connected to the end of a branch circuit during the construction of the building.

The circuit according to the invention is conveniently packaged as illustrated in FIG. 7. This package is known in the trade as the MINIMODUL case, manufactured by Dehn + Söhne, GmbH of Neumarkt, Germany. This package can have wire leads for coupling the circuit to a conventional wall outlet on a branch circuit. Alternatively, the package shown in FIG. 7 can be provided with pins for plug or solder connection to a printed circuit board inside electronic equipment.

Another appropriate package is a small plastic cube with a NEMA 15-5 plug on one side. A socket may be provided on the opposite side.

Preferably, the novel suppressor described herein is installed at wall outlets at the end of branch circuits inside a building at the same time that the building is wired. The novel suppressor can also be installed at existing wall outlets that supply power to critical equipment, such as computers or electronic controls, or in plug strip devices and the like. Alternatively, the novel suppressor can be installed inside electronic equipment to help prevent damage or upset of operation from transient overvoltages that propagate along the mains.

An important advantage of this novel suppressor is that it is very low in cost. Therefore, the total cost of the surge protection in a building can be minimized by using just one expensive arrester per building, but many inexpensive surge suppressors per building.

It will thus be seen that the objects set forth above are efficiently attained. Furthermore, since certain changes may be made in the above construction without departing from the true scope of the invention, it is intended that all matter contained in the above description or shown in the drawings be interpreted as illustrative and not limiting. In particular, as materials technology evolves, doubtless there will become available other specific components that can be advantageously used in the circuit according to the invention as disclosed and claimed.

I claim:

1. A two-terminal surge suppressor circuit, comprising:
   two parallel legs for coupling across the electric conductors, one of the legs comprising a resistor and a capacitor coupled in series, and the other of the legs comprising a nonlinear surge-protective device operable to conduct current above a predetermined voltage level, said resistor and capacitor coupled in series, in combination with the nonline at surge-protective device, damping oscillations and suppressing transient overvoltages on said conductors.

2. The circuit according to claim 1, wherein the surge-protective device comprises a metal-oxide varistor.

3. The circuit according to claim 1, wherein the surge-protective device comprises a semiconductor having an approximately constant voltage while conducting surge current.

4. The circuit according to claim 3, wherein the surge-protective device comprises at least one avalanche diode.

5. The circuit according to claim 1, further comprising a package for housing the circuit, and wherein the legs are coupled to wire leads protruding from the package for coupling the circuit to power conductors.

6. The circuit according to claim 1, further comprising a standard, electric plug coupled to said branches, for coupling the circuit to the ac supply mains.

7. A protective circuit for electrical conductors extending from a source, into a building and to a load in the building, comprising:
   an arrester connected to the electrical conductors at a point relatively nearer to an entry of the electrical conductors into the building;
   a suppressor connected to the electrical conductors at a point relatively nearer to the load, the suppressor having two parallel legs coupled across the electric conductors adjacent the load, one of the legs comprising a resistor and a capacitor in series, and the other of the legs comprising a nonlinear surge-protective device operable to conduct current above a predetermined voltage level;
   wherein the arrester is connected to the electrical conductors upstream from said suppressor and the arrester comprises a nonlinear surge-protective device operable to conduct current above a predetermined voltage level, and wherein the arrester has a voltage level that is lower than voltage level of the suppressor.

8. The circuit according to claim 1, further comprising a grounding conductor associated with the electric conductors, and a further nonlinear surge-protective device coupled between the ground conductor and one of the electric conductors.

9. The circuit according to claim 8, wherein the electric conductors are a line conductor and a neutral conductor coupled to ac mains, and wherein the further nonlinear surge-protective device is coupled between the grounding conductor and the neutral conductor.

10. The circuit according to claim 9, further comprising an arrester coupled to the electric conductors upstream from said suppressor, and wherein the arrester has a voltage level that is lower than the voltage level of the suppressor.

11. The circuit according to claim 10, wherein the arrester is coupled to the electric conductors adjacent to where the ac mains enter a building and said legs of the suppressor are coupled to the electric conductors adjacent to a load.

12. The circuit according to claim 1, and wherein the resistor defines a resistance of approximately 22 to 50Ω and the capacitor defines a capacitance of approximately 0.1 to 0.5 μF.

13. The circuit according to claim 2, wherein the arrester and suppressor are arranged for operation at approximately 120 V rms, and wherein the reference voltage of the arrester is approximately 240 V at a current of 1 mA, and wherein the reference voltage of the suppressor is approximately 390 V at a current of 1 mA.

14. The circuit according to claim 2, wherein the arrester and suppressor are arranged for operation at approximately 220 V rms, and wherein the reference voltage of the arrester is approximately 430 V at a current of 1 mA, and wherein the reference voltage of the suppressor is approximately 680 V at a current of 1 mA.

15. A method of protecting electric conductors, comprising the steps of:
   coupling across the electric conductors a first leg comprising a resistor and a capacitor coupled in series; and,
   also coupling across the electric conductors a second leg comprising a nonlinear surge-protective device operable to conduct above a predetermined voltage level;
   wherein the resistor and the capacitor coupled in series, in combination with the nonlinear surge-protective device, both suppress transient overvoltages and damp oscillations on said electric conductors.

16. The method according to claim 15, wherein the electric conductors are a line conductor and a neutral conductor coupled to ac supply mains.

17. The method according to claim 15, wherein the electric conductors are arranged to carry dc power.

18. The method according to claim 16, further comprising coupling an arrester to the electric conductors adjacent to where the electric conductors enter a building, and wherein the first and second legs of the suppressor are coupled to the electric conductors downstream from the arrester and adjacent to a load coupled to said electric conductors.

19. The method according to claim 18, wherein the nonlinear surge-protective device in the suppressor has an approximately constant voltage when conducting current and the arrester has a voltage level that is lower than the voltage level of the suppressor.

20. An apparatus for protecting a load coupled to electric conductors coupled to ac mains, comprising:
   a first leg for coupling across the electric conductors, the first leg including a resistor and a capacitor coupled in series;
   a second leg for coupling across the electric conductors in parallel with the first leg, the second leg including a nonlinear surge-protective device operable to maintain an approximately constant voltage when conducting current, thereby providing a voltage level, said first and second legs defining a suppressor and arranged for coupling to the electric conductors at a point nearby a load to be protected from both surges and oscillations on the electric conductors; and, an arrester coupled to the electric conductors upstream from the load and close to where the electric conductors enter a building, the arrester defining a voltage level that is lower than that of the voltage of the nonlinear surge-protective device in the suppressor;

whereby oscillation occurring over the electric conductors between the arrester and the suppressor are damped by the resistor and capacitor for protection of the load.

21. The circuit according to claim 20, wherein the resistor defines a resistance of approximately 22 to 50 Ω and the capacitor defines a capacitance of approximately 0.1 to 0.5 $\mu$F.

22. The circuit according to claim 20, wherein the arrester and suppressor are arranged for operation at approximately 120 V rms, and wherein the arrester has a reference voltage of approximately 240 V at a current of 1 mA, and wherein the suppressor has a reference voltage of approximately 390 V at a current of 1 mA.

* * * * *